(12) United States Patent
Slavik

(10) Patent No.: US 7,657,394 B1
(45) Date of Patent: Feb. 2, 2010

(54) DIRECT DETERMINATION OF RIGID BODY MOTION USING DATA COLLECTED FROM INDEPENDENT ACCELEROMETERS

(75) Inventor: Todd Patrick Slavik, Livermore, CA (US)

(73) Assignee: Livermore Software Technology Corporation, Livermore, CA (US)

(*) Notice: Subject to any disclaimer, the term of this patent is extended or adjusted under 35 U.S.C. 154(b) by 508 days.

(21) Appl. No.: 11/685,010

(22) Filed: Mar. 12, 2007

(51) Int. Cl.
*G01P 15/00* (2006.01)

(52) U.S. Cl. .......................... 702/141; 73/493

(58) Field of Classification Search ......... 702/141–142, 702/149, 189–190, 198; 73/493, 504.01–504.03, 73/514.01–514.02; 701/207
See application file for complete search history.

(56) References Cited

U.S. PATENT DOCUMENTS

| | | | |
|---|---|---|---|
| 6,596,976 B2 * | 7/2003 | Lin et al. | 244/3.2 |
| 7,043,364 B2 * | 5/2006 | Scherzinger | 701/213 |
| 7,050,102 B1 * | 5/2006 | Vincent | 348/333.02 |
| 7,142,981 B2 * | 11/2006 | Hablani | 701/213 |
| 7,414,611 B2 * | 8/2008 | Liberty | 345/158 |

* cited by examiner

*Primary Examiner*—Eliseo Ramos Feliciano
*Assistant Examiner*—Mary C Baran
(74) *Attorney, Agent, or Firm*—Roger H. Chu

(57) ABSTRACT

System and method for enabling direct determination of rigid body motion using data collected from a plurality of independent accelerometers are disclosed. A mechanical object that can be theoretically emulated as a rigid body is instrumented with a plurality of accelerometers at different locations. Direct determination of rigid body motion at a location of interest includes following operations at each solution time step: transform local acceleration to global, integrate accelerations to obtain velocities, calculate direction cosine matrix using the angular velocity matrix, form a first set of redundant equations, obtain the angular velocity by solving the first set of equations using either least squares fitting or a selective Gaussian elimination scheme, form a second set of redundant equations and obtain the translational velocity by solving the second set of equations using either the averaged value or a pre-defined rule such as minimizing the contribution from the rotational term.

19 Claims, 8 Drawing Sheets

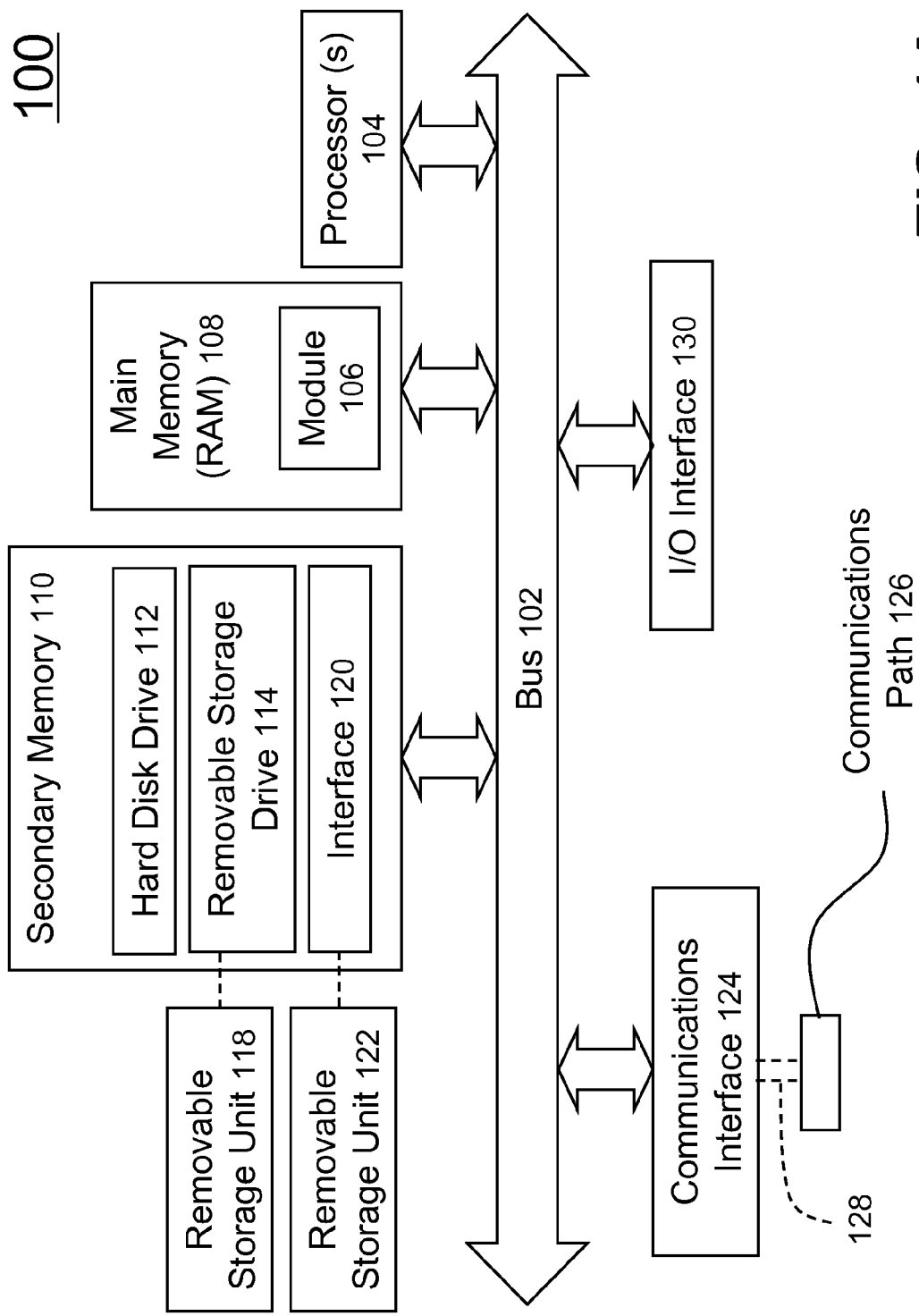

DIRECT DETERMINATION OF RIGID BODY MOTION USING DATA COLLECTED FROM INDEPENDENT ACCELEROMETERS

FIELD OF THE INVENTION

The present invention generally relates to a method, system and software product used in the area of mechanical computer-aided engineering design and analysis, more particularly to direct determination of rigid body motion using data collected from independent accelerometers.

BACKGROUND OF THE INVENTION

In physics, a rigid body is an idealization of a solid body of finite size in which deformation is neglected. In other words, the distance between any two given points of a rigid body remains constant regardless of external forces exerted on it. Engineers use rigid bodies to represent mechanical objects or parts (e.g., automobiles, engine blocks, etc) in an engineering analysis or simulation (e.g., finite element analysis). Sometimes, a mechanical part that is relatively rigid compared to the neighboring parts can also be modeled as rigid body. In many instance, simulating dynamic behaviors of a rigid body requires that three-dimensional motions be specified at a particular location on the rigid body. Physically, the motions of a mechanical object are measured by an instrument called accelerometer, which is an electromechanical device that is used for measuring acceleration forces. These forces may be static, like the constant force of gravity pulling at your feet, or they could be dynamic—caused by moving or vibrating the accelerometer.

In order to measure the acceleration of a relatively large mechanical object such as automobile, more than one accelerometer must be placed in different locations independently. The recorded accelerations can then be converted to a set of three-dimensional motions at any point of interest on the mechanical object. However, converting such measured data is not straight forward and has a number of problems including, but not necessarily limited to, 1) reducing redundant data, 2) minimizing measurement error, and 3) producing consistent determination.

Therefore, it would be desirable to have a new improved method to determine rigid body motion using data collected from independent accelerometers directly.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

The present invention discloses a system, method and software product for enabling direct determination of rigid body motion using data collected from a plurality of independent accelerometers. According to one aspect of the present invention, a mechanical object (e.g., an automobile) that can be theoretically emulated as a rigid body is instrumented with a plurality of accelerometers at different locations. Each of the accelerometers independently measures accelerations at its location in three orthogonal directions that form a local reference frame. The acceleration records are optionally filtered to eliminate the high frequency noises. Each of the acceleration records can then be converted to velocity time history by integrating over time. In order to describe the rigid body motion, a global reference frame is defined. The rigid body motion in terms of translational and angular velocities is then determined at any point of the rigid body directly from the set of velocity records in the global reference frame.

According to another aspect, the direct determination of rigid body motion (i.e., angular and translational velocity) at a location of interest (e.g., center of mass of the rigid body) includes at least the following operations: 1) convert velocity record from its local reference frame to the global reference frame, 2) form a first set of redundant equations based on the locations of the accelerometers, 3) obtain the angular velocity by solving the first set of equations using either least squares fitting or a selective Gaussian elimination scheme, 4) form a second set of redundant equations between the location of interest and each of the accelerometer locations, 5) obtain the translation velocity by solving the second set of equations using either the averaged value or a pre-defined rule such as minimizing contribution from the rotational term, 6) calculate direction cosine matrix using the obtained angular velocity and current orientation, and 7) repeating steps 1-6 for at next time step. In an exemplary embodiment, the number of accelerometers is N, where N is an integer greater or equal to 2. The number of the first set of redundant equations is $(N \times (N-1)/2)$. The number of the second set of redundant equations is N.

According to one embodiment, the present invention is a method for direct determination of angular and translation velocity at a particular location on a rigid body in a global reference frame based on measured accelerations collected from a plurality of independent accelerometers instrumented on the rigid body, the method includes at least the following: (a) receiving the measured accelerations, orientation of each of the accelerometers and orientation of the rigid body; (b) forming initial direction cosine matrices in the global reference frame for said each of the accelerometers and for the rigid body using the respective orientations; (c) initializing current solution time; (d) transforming measured accelerations to the global reference frame; (e) calculating global velocity by integration the transformed global accelerations; (f) calculating current direction cosine matrices based on previous direction cosine matrices and the angular velocity; (g) creating a first set of redundant vector equations for the angular velocity; (h) obtaining the angular velocity by solving the first set of redundant equations using a first solution technique; (i) creating a second set of redundant vector equations for the translational velocity; j) obtaining the translational velocity by solving the second set of redundant equations using a second technique; (k) updating the current solution time; and repeating (d) to (k) until the current time is greater than pre-defined total solution time.

One of the objects, features, and advantages of the present invention is to consistently create a set of numerical rigid body motion data for a computer simulation directly from data collected from accelerometers with minimized measurement errors and repeatable determination.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 1A is a simplified block diagram depicting some of the components of an exemplary computer, in which one embodiment of the present invention may be implemented;

DETAILED DESCRIPTION

Figure 1B:
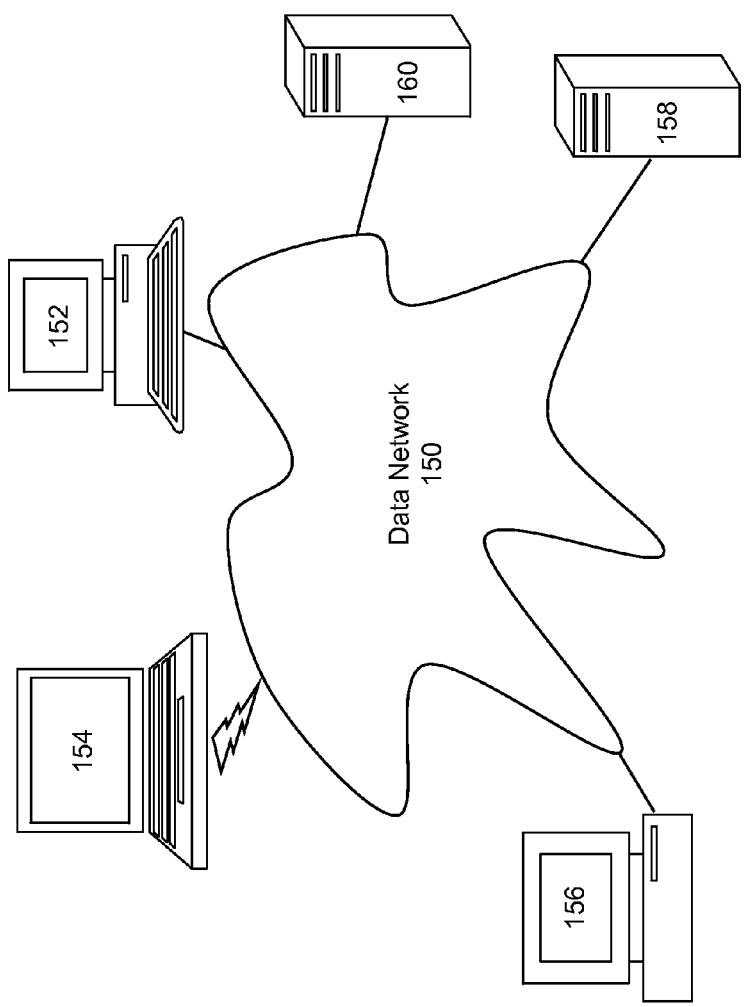
FIG. 1B is a simplified diagram showing some of the components of an exemplary network environment that one embodiment of the present invention may be deployed.

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-4B. However, those skilled in the art will readily appreciate that the detailed description given herein with respect to these figures is for explanatory purposes as the invention extends beyond these limited embodiments.

Referring now to the drawings, in which like numerals refer to like parts throughout several views. The present invention may be implemented using hardware, software or a combination thereof and may be implemented in a computer system or other processing system. In fact, in one embodiment, the invention is directed towards one or more computer systems capable of carrying out the functionality described herein. An example of a computer system 100 is shown in FIG. 1A. The computer system 100 includes one or more processors, such as processor 104. The processor 104 is connected to a computer system internal communication bus 102. Various software embodiments are described in terms of this exemplary computer system. After reading this description, it will become apparent to a person skilled in the relevant art(s) how to implement the invention using other computer systems and/or computer architectures.

Computer system 100 also includes a main memory 108, preferably random access memory (RAM), and may also include a secondary memory 110. The secondary memory 110 may include, for example, one or more hard disk drives 112 and/or one or more removable storage drives 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc. which is read by and written to by removable storage drive 114. As will be appreciated, the removable storage unit 118 includes a computer usable storage medium having stored therein computer software and/or data.

In alternative embodiments, secondary memory 110 may include other similar means for allowing computer programs or other instructions to be loaded into computer system 100. Such means may include, for example, a removable storage unit 122 and an interface 120. Examples of such may include a program cartridge and cartridge interface (such as that found in video game devices), a removable memory chip (such as an EPROM, universal serial bus USB flash memory, or PROM) and associated socket, and other removable storage units 122 and interfaces 120 which allow software and data to be transferred from the removable storage unit 122 to computer system 100. In general, Computer system 100 is controlled and coordinated by operating system (OS) software, which performs tasks such as process scheduling, memory management, networking and I/O services. Exemplary OS includes Linux®, Microsoft Windows®.

There may also be a communications interface 124 connecting to the bus 102. Communications interface 124 allows software and data to be transferred between computer system 100 and external devices. Examples of communications interface 124 may include a modem, a network interface (such as an Ethernet card), a communications port, a PCMCIA slot and card, etc. Software and data transferred via communications interface 124 are in the form of signals 128 which may be electronic, electromagnetic, optical, or other signals capable of being received by communications interface 124. These signals 128 are provided to communications interface 124 via a communications path (i.e., channel) 126. This channel 126 carries signals (or data flows) 128 and may be implemented using wire or cable, fiber optics, a phone line, a cellular phone link, an RF link, a Bluetooth® wireless link and other communications channels.

The channel 126 facilitates a data flow 128 between a data network and the computer 100 and typically executes a special set of rules (i.e., a protocol) to send data back and forth. One of the common protocols is TCP/IP (Transmission Control Protocol/Internet Protocol) commonly used in the Internet. In general, the communication interface 124 manages the assembling of a data file into smaller packets that are transmitted over the data network or reassembles received packets into the original data file. In addition, the communication interface 124 handles the address part of each packet so that it gets to the right destination or intercepts packets destined for the computer 100.

In this document, the terms "computer program medium" and "computer usable medium" are used to generally refer to media such as removable storage drive 114, a hard disk installed in hard disk drive 112, and signals 128. These computer program products are means for providing software to computer system 100. The invention is directed to such computer program products.

The computer system 100 may also include an I/O interface 130, which provides the computer system 100 to access monitor, keyboard, mouse, printer, scanner, plotter, and alike.

Computer programs (also called computer control logic) are stored as application modules 106 in main memory 108 and/or secondary memory 110. Computer programs may also be received via communications interface 124. Such computer programs, when executed, enable the computer system 100 to perform the features of the present invention as discussed herein. In particular, the computer programs, when executed, enable the processor 104 to perform features of the present invention. Accordingly, such computer programs represent controllers of the computer system 100.

In an embodiment where the invention is implemented using software, the software may be stored in a computer program product and loaded into computer system 100 using removable storage drive 114, hard drive 112, or communications interface 124. The application module 106, when executed by the processor 104, causes the processor 104 to perform the functions of the invention as described herein.

The main memory 108 may be loaded with one or more application modules 106 that can be executed by one or more processors 104 with or without a user input through the I/O interface 130 to achieve desired tasks. In operation, when at least one processor 104 executes one of the application modules 106, the results are computed and stored in the secondary memory 110 (i.e., hard disk drive 112). The status of the finite element analysis is reported to the user via the I/O interface 130 either in a text or in a graphical representation.

In one embodiment, a first application module 106 is configured to facilitate the conversion of acceleration records collected from accelerometers instrumented in a rigid body to velocity records with optional filtering technique. In another embodiment, a second application module 106 is configured to facilitate the creation of a first and a second set of redundant equations for angular and translational velocity of the rigid body, respectively. In yet another embodiment, a third application module 106 is configured to facilitate obtaining angular and translational velocity by solving the first and second set of redundant equations using different user defined techniques. In yet still another embodiment, a fourth application module 106 is configured to facilitate the formation of direction cosine matrix at each time step.

FIG. 1B depicts a networked computing environment 140, in which one embodiment of the present invention may be practiced. A plurality of network capable computing devices 152, 154, 156, 158 and 160 (e.g., the computer device 100 described in FIG. 1A) are coupled to a data network 150. These computing devices 152-160 can communicate with each other via the network 150. The data network 150 may include, but is not limited to, the Internet, an Intranet, local area network (LAN), wide area network (WAN), a wireless network or a data network comprises of public and private networks. In one embodiment, a software module (e.g., 106 in FIG. 1A) for direct determination of rigid body motion using data collected from a plurality of independent accelerometers may be configured and executed on a computing device 158, while the pre- and post-processing of the determination are conducted on another computing device 156.

Figure 2A:
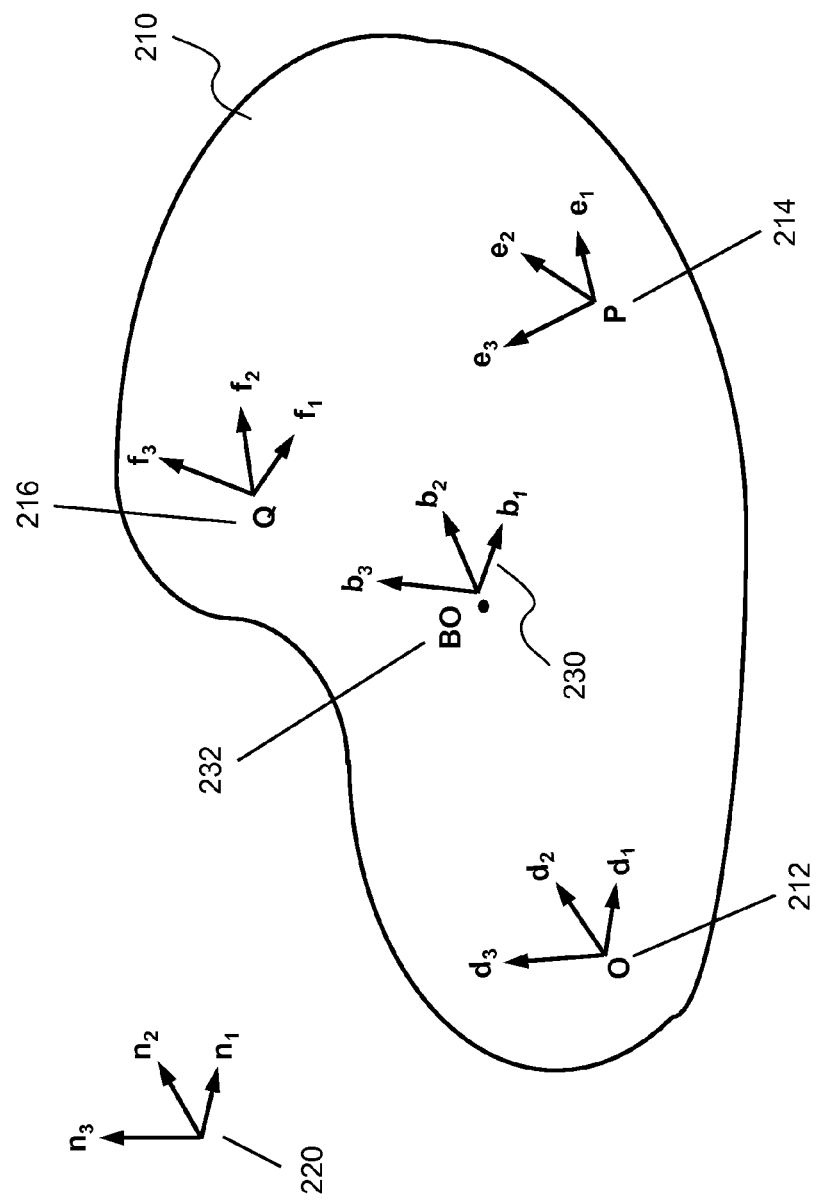
FIG. 2A is a diagram illustrating an exemplary rigid body instrumented with three independent accelerometers in accordance with one embodiment of the present invention.

FIG. 2A is a diagram illustrating an exemplary rigid body instrumented with three independent accelerometers in accordance with one embodiment of the present invention. The exemplary three-dimensional rigid body 210 represents a mechanical object (e.g., an automobile) that is rigid or relatively rigid. A global reference frame 220 is established such the global motions can be described and observed by an observer in the three-dimensional space (e.g., the Earth). In this embodiment, the global reference frame 220 is a reference frame based in which three orthogonal (i.e., mutually perpendicular) unit vectors $n_1$, $n_2$, and $n_3$ are fixed and obey the right hand rule such that $n_3=n_1 \times n_2$ (i.e., $n_3$ is equal to the cross-product of $n_1$ and $n_2$). A rigid body local reference frame 230 is attached to the rigid body and in it are fixed three orthogonal unit vectors $b_1$, $b_2$, and $b_3$ such that $b_3=b_1 \times b_2$ (i.e., $b_3$ is equal to the cross-product of $b_1$ and $b_2$). The relationship between the global reference frame 220 and the rigid body local reference frame 230 is given by a direction cosine matrix. A point of interest BO 232 is fixed on rigid body 210. In one embodiment, the point of interest BO 232 is the center of mass of the rigid body 210. In another embodiment, the point of interest BO 232 is the geometric center of the rigid body 210. In order to perform a computer simulation of the rigid body 210 in a time domain dynamic analysis, its six degrees of motion must be known at each time step.

Many of the computer simulations are based on a time history of the six degrees of motion measured in a real event—, for example, a prototype automobile crash test. A typical method to measure the motion is to instrument a number of independently located accelerometers on the prototype automobile to record the accelerations throughout the crash test. For illustration simplicity, FIG. 2A shows three accelerometers attached at three different points O, P and Q. The present invention does not set a limit as to the number of accelerometers as long as the independently located accelerometers can capture all modes of rigid body motion. For example, three or more noncolinear accelerometers are able to measure every possible mode of three-dimensional motion of a rigid body. Two separated accelerometers can measure all modes except the spinning mode about a line passing through the two attachment points of the accelerometers.

Each of the accelerometers may have its accelerometer reference frame that is different from the orientation of the global reference frame 220, the rigid body local reference frame 230, and from each other. The relationship between any one of the accelerometer reference frames 212, 214 and 216, and the global reference frame 220 can be mathematically described in a direction cosine matrix. The first accelerometer reference frame 212 at point O has three orthogonal unit vectors $d_1$, $d_2$ and $d_3$, while the second accelerometer reference frame 214 at P has unit vectors $e_1$, $e_2$ and $e_3$, and the third accelerometer reference frame 216 at Q has unit vectors $f_1$, $f_2$ and $f_3$. In this embodiment, nine channels of acceleration time histories are recorded at three independently located accelerometers, one channel for each of the unit vectors $d_1$, $d_2$, $d_3$, $e_1$, $e_2$, $e_3$, $f_1$, $f_2$ and $f_3$. The acceleration time histories may include noises during the recordation or from the instrument. These noises may be optionally filtered out with a standard filtering technique for eliminating undesired records at certain frequencies (e.g., frequencies higher than a pre-defined threshold). Because acceleration time histories are recorded at a pre-determined sample rate, it is very straight forward to convert these acceleration time histories into velocity time histories by integrating the records over time according to the following equation:

$$V = \int A \, dt \tag{1}$$

where A denotes the acceleration and V denotes the velocity. The determination of the velocity is performed in the computer simulation when time step size $\Delta t$ is in sync with the sample rate of the measurement.

In order to create a time history of the six-degree rigid body motion in the global reference frame 220 based on the data collected from the accelerometers, a direct determination method described herein is used. At each point in time, the acceleration records from the respective accelerometer local directions are transformed to the global directions. The transformation is performed by multiplying the respective direction cosine matrix $C_{ij}$ with the local accelerations $a_j$ to obtain the global accelerations $A_j$. The following equations are for the rigid body with three accelerometers of FIG. 2A:

$$A_j^O = C_{ij}^D a_j^O \quad A_j^P = C_{ij}^E a_j^P \quad A_j^Q = C_{ij}^F a_j^Q$$

$$\text{where } C_{ij}^D = n_i \cdot d_j \; C_{ij}^E = n_i \cdot e_j \; C_{ij}^F = n_i \cdot f_j \; j=1,2,3 \tag{2}$$

The "•" in Equation (2) is a mathematical operator representing dot product. The global accelerations $A_j$ are then integrated over the current time step to obtain the respective global velocities $V_j$ using Equation (1). The rigid body motion at any location of interest (e.g., location BO 232 of FIG. 2A) can then be determined with two sets of redundant vector equations: a first set for angular velocity and a second set for translational velocity.

The first set of redundant equations for the configuration of FIG. 2A is listed as follows:

$$V^P = V^O + \omega \times {}^O p^P \quad V^Q = V^O + \omega \times {}^O p^Q \quad V^Q = V^P + \omega \times {}^P p^Q$$

$$\omega = [\omega_1 \, \omega_2 \, \omega_3] \tag{3}$$

where $V^O$, $V^P$ and $V^Q$ are the velocity vectors at the accelerometer locations O 212, P 214 and Q 216, $\omega$ is the unknown angular velocity vector of the rigid body 210 at a particular time expressed in the global reference frame, and ${}^O p^P$ 222, ${}^O p^Q$ 226 and ${}^P p^Q$ 224 are the position vectors between a unique pair of accelerometers. For example, ${}^O p^P$ represents a position vector from accelerometer O 212 to accelerometer P 214 and ${}^P p^Q$ a position vector from accelerometer P 214 to accelerometer Q 216, etc. Because it is more convenient to describe the locations O 212, P 214 and Q 216 in the local reference frame 230, the position vectors are often described in the local reference frame 230 first before transforming to the global reference frame 220 using direction cosine matrix between the global and local reference frames in accordance with the following equations:

$${}^O p^P C_{ij}^{BO} p^P \; {}^O p^Q = C_{ij}^{BO} p^Q \; {}^P p^Q = C_{ij}^{BP} p^Q \tag{4}$$

$$\text{where } C_{ij}^B = n_i \cdot b_j \; i,j=1,3$$

Figure 2B:
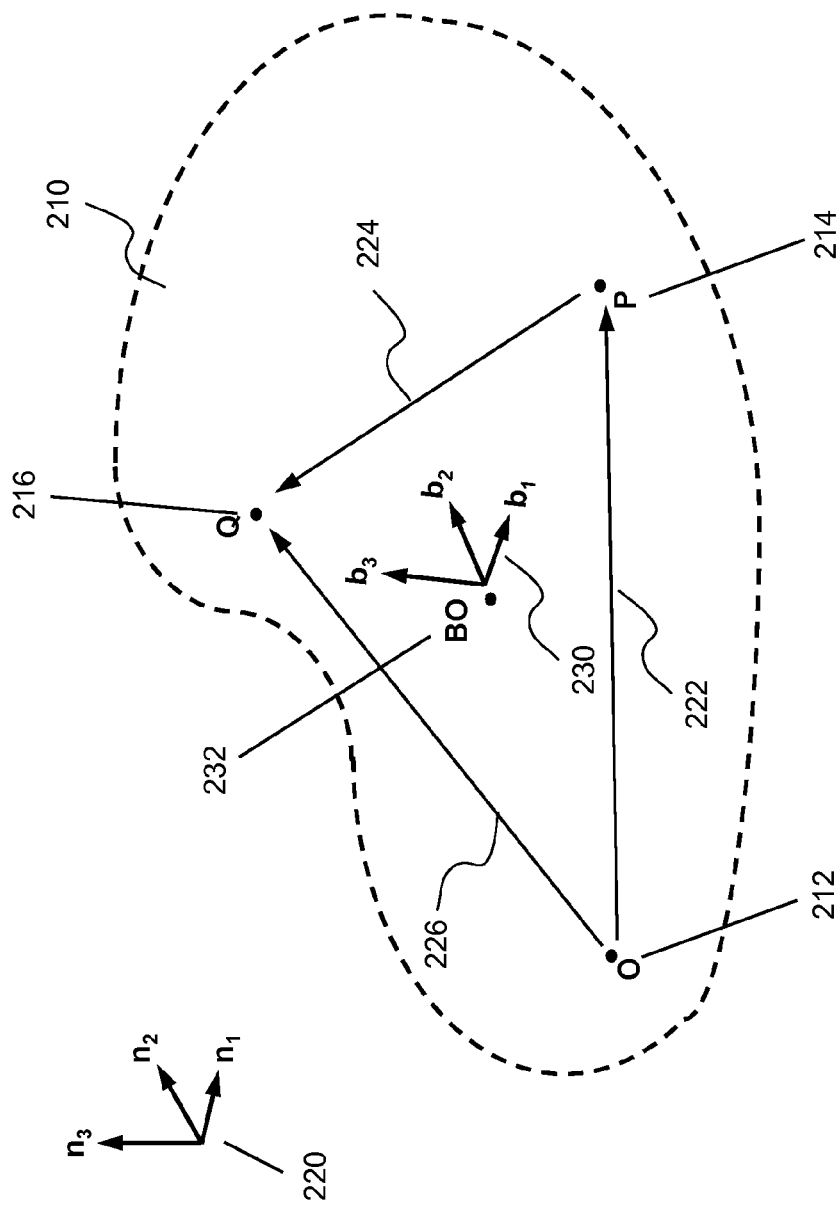
FIG. 2B shows a diagram showing how an exemplary set of redundant equations for angular velocity is created in the rigid body of FIG. 2A.

FIG. 2B shows a diagram illustrating various components in forming the first set of redundant equations, which are formed among the different locations of the accelerometers, one vector equation for each unique pair of accelerometers. The unknown angular velocity vector $\omega$ has three measure numbers $\omega_1$, $\omega_2$ and $\omega_3$ corresponding to the unit vectors $n_1$, $n_2$, and $n_3$ of the global reference frame 220. As each of the vector Equations in (3) expands to three scalar equations, there are more equations than the number of unknowns hence Equations (3) are redundant. Two options can be used to solve Equations (3): i) least squares fitting and ii) selective Gaussian elimination. These options may be pre-defined by the user or determined by an algorithm dynamically. The option may be selected for entire process of determination of the rigid body motion or may be selected at each time step of the process.

Figure 3:
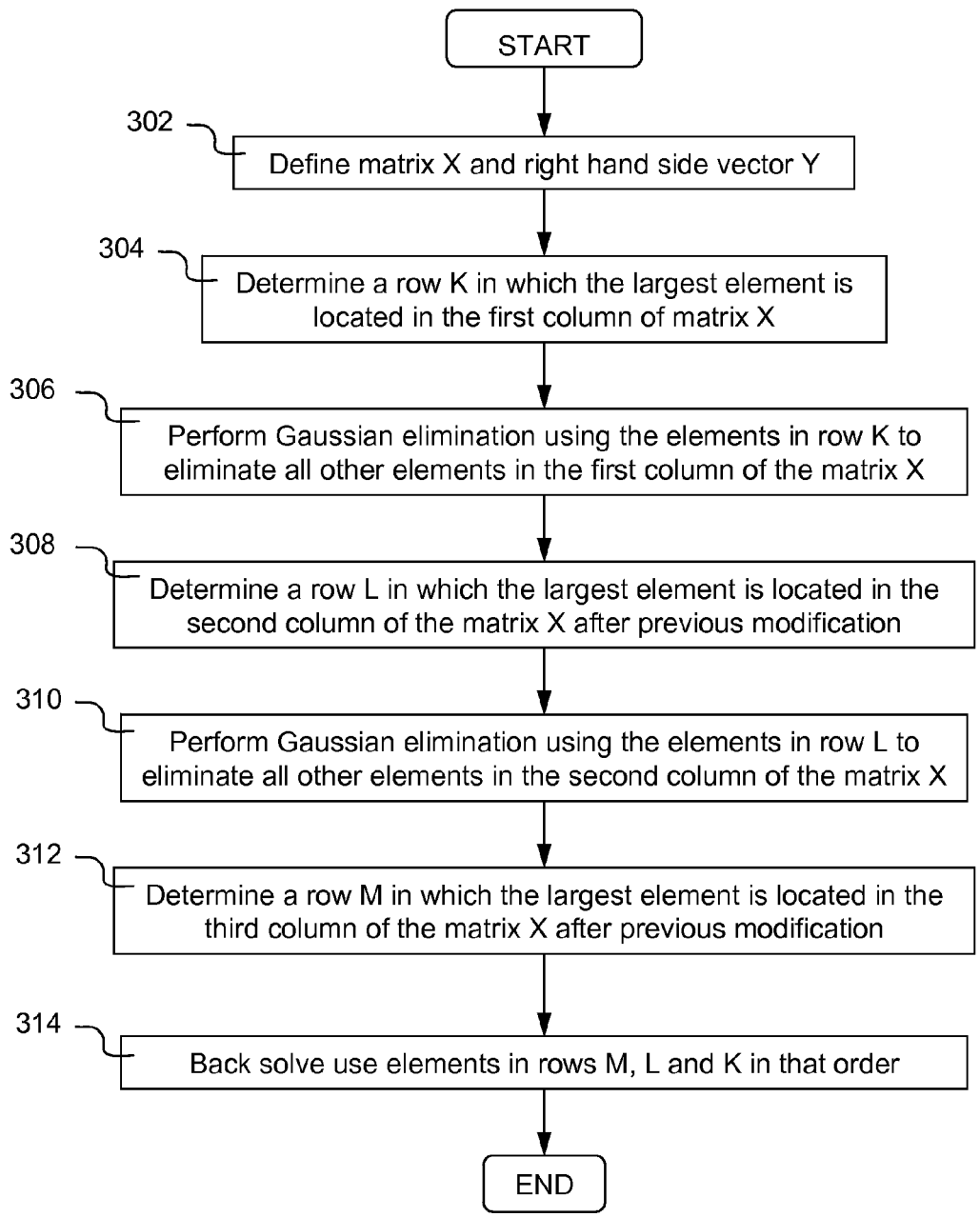
FIG. 3 is a flow chart showing the process of selective Gaussian elimination method in accordance with one embodiment of the present invention.

The first option to solve Equations (3) is to obtain the preliminary solutions using all of the redundant equations, then a least squares fitting of all of the preliminary solutions yields the solution. The second option to solve Equations (3) is referred to as selective Gaussian elimination method. Equations (3) can be written in the following form:

$$[X]\{\omega\} = \{Y\} \tag{3a}$$

where $\omega$ is the unknown angular velocity vector with three components $\omega_1$, $\omega_2$ and $\omega_3$, X is a mx3 matrix and Y is a mx1 vector with m is a positive integer equal to a multiple of three. For example, m is 9 when three redundant vector equations (3a) are included. The goal of the second option is to select and use the best conditioned numbers in X to obtain a solution for $\omega$. In one embodiment, the process 300 of selective Gaussian elimination method is illustrated in a flow chart as shown in FIG. 3. The process 300 starts at 302 by defining a matrix X and a right hand side (RHS) vector Y. Next at 304, the process 300 scans and determines a row K, in which the largest element, $X_{K1}$, is located in the first column or column one of the matrix X. The process 300 then performs a Gaussian elimination using $X_{k1}$ to eliminate all other elements in the first column of the matrix X without altering any elements in row K at 306. In other words, all other elements in the first column of the modified matrix X become zero after step 306. It is noted that the elements in corresponding rows in vector Y are also modified at step 306. At step 308, the process 300 scans and determines a row L, in which the largest element $X_{L2}$ is located in the second column or column two of the modified matrix X ignoring row K. Another Gaussian elimination is performed at 310 using $X_{L2}$ to eliminate all other terms in the second column of the modified matrix X without altering rows K and L. Corresponding elements in the RHS vector Y are modified as well. The process 300, at step 312 again scans and determines a row M, in which the largest element, $X_{M3}$, is located in the third column or column three of the modified matrix X ignoring rows K and L. Next at step 314, the process 300 back solves the unknown vector $\omega$ using elements in the rows K, L and M as follows:

$$\omega_3 = Y_M / X_{M3}$$

$$\omega_2 = (Y_L - \omega_3 X_{L3}) / X_{L2}$$

$$\omega_1 = (Y_K - \omega_3 X_{K3} - \omega_2 X_{K2}) / X_{K1} \tag{3b}$$

The process 300 ends after the unknowns are solved. Physically, the selective Gaussian elimination method enables a set of solutions based on a set of measured data with least likelihood of numerical inaccuracy. In other words, the best accuracy amongst the measured accelerations is achieved using the selective-reduce Gaussian elimination method.

Figure 2C:
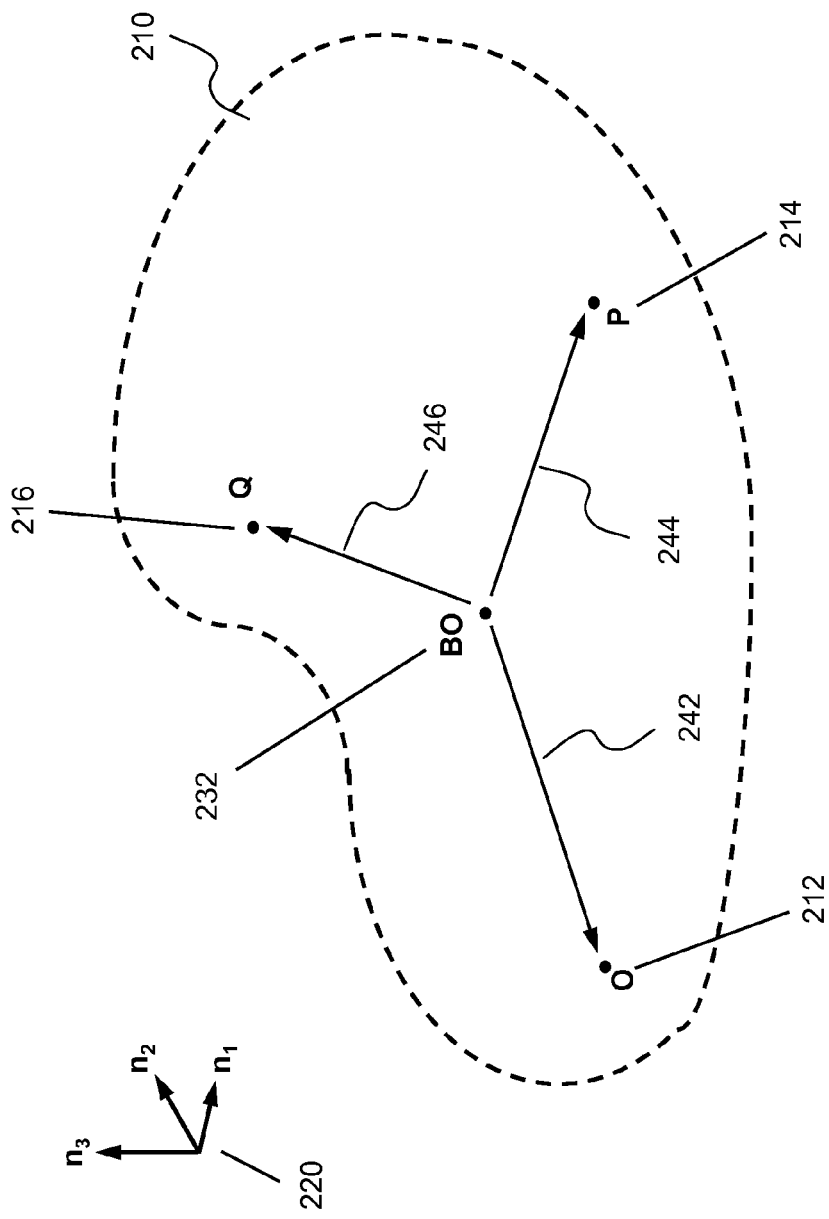
FIG. 2C shows a diagram showing how an exemplary set of redundant equations for translational velocity is created in the rigid body of FIG. 2A.

Regarding the second set of redundant equations, the following are the exemplary equations for the configuration of FIG. 2A:

$$V^{BO} = V^O - \omega \times {}^{BO} p^O \quad V^{BO} = V^P - \omega \times {}^{BO} p^P \quad V^{BO} = V^Q - \omega \times {}^{BO} p^Q$$

$$V^{BO} = [v_1 \, v_2 \, v_3] \tag{5}$$

where $V_{BO}$ is the unknown translational velocity vector at the location of interest BO 232 (e.g., center of mass of the rigid body 210), and "x" in the second term (i.e., the rotational term) of the vector equations is a mathematical operator representing cross product. The unknown velocity vector $V_{BO}$ has three measure numbers $v_1$, $v_2$ and $v_3$ corresponding to the unit vectors $n_1$, $n_2$, and $n_3$ of the global reference frame 220. The velocity vectors $V^O$, $V^P$ and $V^Q$ corresponding, respectively, to locations O 212, P 214 and Q 216, $\omega$ is the angular velocity vector of the rigid body 210 obtained from the first set of redundant equations, and $^{BO}P^O$ 242, $^{BO}P^P$ 244 and $^{BO}P^Q$ 246 are the position vectors expressed in the global reference, respectively, between point BO 232 and each of the accelerometers O 212, P 214, or Q 216. Equations (5) are expressed in the global reference frame 220. FIG. 2C shows a diagram illustrating the components in forming the second set of redundant equations, which are formed between the point of interest BO 232 and each unique one of the accelerometer locations. Similar to the first set of redundant equations, there are more equations than the number of unknowns in the second set also. The number of unknown translational velocities is three (i.e., $v_1$, $v_2$ and $v_3$). Each of the vector Equations in (5) includes three scalar equations thereby there are nine equations for three unknowns. There are also at least two options to solve the second set of equations: i) average value and ii) a predefined criterion (e.g., user specified criterion such as minimizing the rotational term in Equations (5)).

The first option in solving Equations (5) is to obtain preliminary solutions from all of the redundant sets of equations first. Then the average value of the preliminary solutions is the final solution using the average value method. In the second option, the criterion may be defined by the user (e.g., an option in the application program module). In one embodiment, the criterion is defined as the minimizing of rotational term due to the confidence level of the derived angular velocity ω. If the derived angular velocity is doubtful, the user may choose to use the second option, in which the influence of the angular velocity is lower (i.e., minimized) thereby higher confidence level for the calculated velocity from Equation (5).

After the rigid body motion (i.e., the angular and the translational velocity) has been determined at the location of interest BO 232 in a particular time, the direction cosine matrix can be updated with the following equation for the subsequent time step:

$$C_{ij}^{BO(n+1)} = \int C_{ij}^{BO(n)} \tilde{\omega}^{(n)} dt \qquad (6)$$

$$\tilde{\omega} = \begin{bmatrix} 0 & -\omega_3 & \omega_2 \\ \omega_3 & 0 & -\omega_1 \\ -\omega_2 & \omega_1 & 0 \end{bmatrix}$$

where superscript (n) denotes the current time step and superscript (n+1) denotes the next time step and $\tilde{\omega}$ is the angular velocity matrix. The other direction cosine matrices $C_{ij}^D$, $C_{ij}^E$ and $C_{ij}^F$ are updated in a similar manner.

Figure 4A:
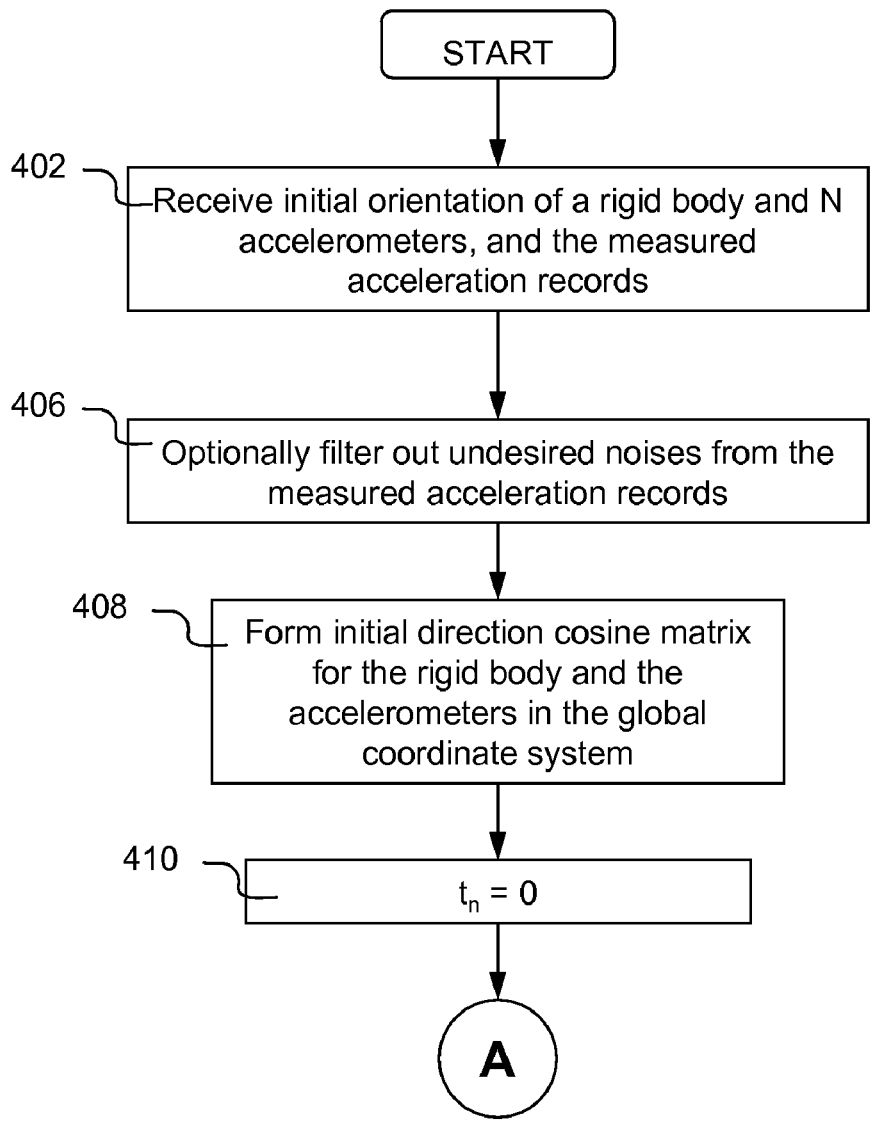
FIGS. 4A and 4B collectively show a flow chart of the process of enabling direct determination of rigid body motion using data collected from a plurality of independent accelerometers in accordance with one embodiment of the present invention.
Figure 4B:
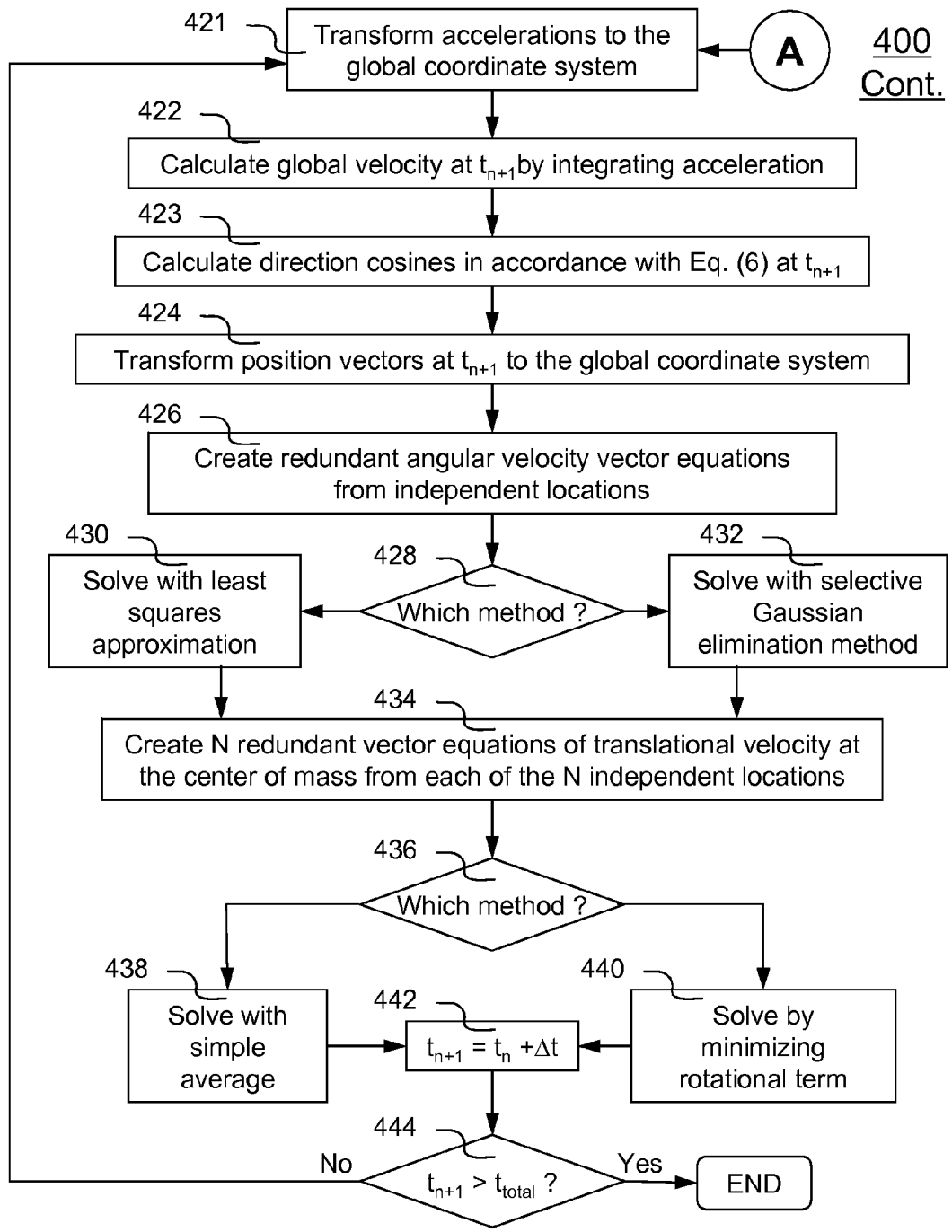

FIGS. 4A and 4B collectively show a flow chart for the process 300 of direct determination of rigid body motion using data collected from a plurality of independent accelerometers in accordance with one embodiment of the present invention. The process 400, which is preferably understood in conjunction with the previous figures especially FIGS. 2A-2C, may be implemented in software. Process 400 starts by receiving measured data such as accelerations from a plurality of independent accelerometers (e.g., accelerometers O 212, P 214 and Q 216 of FIG. 2A) attached at different points on a rigid body (e.g., rigid body 210 of FIG. 2A) at 402. The information also received at 402 includes the orientation of the rigid body, the orientation of each of the accelerometer reference frames, and the orientation of a global reference frame 220 to define the rigid body motion. Next at 406, the process 400 optionally applies the filtering technique to filter out the high frequency noises from the measured data collected from the accelerometers. The process 400 then forms initial direction cosines matrix for the rigid body and the plurality of accelerometers in the global reference frame at 408. The process 400 sets the initial time as zero at 410, so that a set of rigid body motion can be determined. The process 400 moves to 421 to transform each of received acceleration records from its accelerometer reference frame to the global reference frame. Next at 422, the process 400 calculates the velocity for the subsequent solution cycle at $t^{n+1}$ by integrating the transformed global acceleration records over time. Then at 423, the process 400 calculates the direction cosine matrix at $t^{n+1}$ using Equation (6). The process 400 creates local position vectors between each unique pair of the accelerometers and transforms the local position vector to the global reference frame at 424.

Next, at 426, the process 400 creates a first set of redundant equations (3) for solving the unknown angular velocity. The process 400 needs to create (N×(N−1)/2) redundant vector equations. The number N is the number of instrumented accelerometers. The process 400 moves to 428 to determine which solution technique to use in solving the first set of redundant equations. The choice of the techniques includes: 1) least squares fitting 430 and 2) a selective Gaussian elimination 432. The choice may be predefined for the determination of the rigid body motion or it may be defined dynamically at each time step. The process 400 is then merged to 434, in which a second set of redundant equations are created for the unknown translational velocity at the location of interest (e.g., center of mass 232 of the rigid body 210). The total number of the second set of redundant vector equations is N. Then, the process 400 needs to determine one of the two techniques to solve the second set of redundant equations at 436. One technique is a simple average at 438 and the other is to minimize the rotational term 440. After the translational velocity has been obtained at the particular time $t^n$, the process 400 increments the solution time such as adding an increment Δt to the current time at 442. The process 400 then moves to a test 444, in which the current solution time is compared with the total solution time. If the current solution has exceeded the total solution time, the process 400 ends as the test 444 is true. Otherwise, the process 400 follows the 'no' branch back to 432 to repeat the process 400 until the test 444 has become true.

Although an exemplary embodiment of invention has been disclosed, it will be apparent to those skilled in the art that various changes and modifications may be made to achieve the advantage of the invention. It will be obvious to those skilled in the art that some components may be substituted with another component providing the same function. The appended claims cover the present invention.

I claim:

1. A method of direct determination of angular and translational velocity at a particular location on a rigid body in a global reference frame based on measured accelerations collected from a plurality of independent accelerometers instrumented on the rigid body, the method comprising:

(a) receiving, in a computer system having an application module for direct determination of angular and translation velocity at a particular location on a rigid body installed thereon, the measured accelerations, orientation of each of the accelerometers and orientation of the rigid body;

(b) forming initial direction cosine matrices for said each of the accelerometers and for the rigid body using the respective orientations in the computer system;

(c) initializing current solution time in the computer system;

(d) transforming measured accelerations to the global reference frame in the computer system;

(e) calculating global velocity by integrating the transformed global accelerations in the computer system;

(f) calculating current direction cosine matrices based on previous direction cosine matrices and the angular velocity matrix in the computer system;

(g) creating a first set of redundant vector equations for the angular velocity in the computer system;

(h) obtaining the angular velocity by solving the first set of redundant equations using a first solution technique in the computer system;

(i) creating a second set of redundant vector equations for the translational velocity in the computer system;

(j) obtaining the translational velocity by solving the second set of redundant equations using a second technique in the computer system;

(k) updating the current solution time in the computer system; and repeating (d) to (k) until the current time is greater than pre-defined total solution time, wherein both the angular velocity and the translational velocity are displayed to a monitor coupled to the computer system.

2. The method of claim 1, further comprising optionally filtering out high frequency noises of the measured accelerations.

3. The method of claim 1, the orientation of each of the independent accelerometers is represented by an accelerometer reference frame and the orientation of the rigid body is represented by a local reference frame.

4. The method of claim 1, wherein number of the accelerometers is N, wherein N is a positive integer greater or equal to 2.

5. The method of claim 4, wherein number of the first set of redundant vector equations is $(N \times (N-1)/2)$.

6. The method of claim 4, wherein number of the second set of redundant vector equations is N.

7. The method of claim 1, wherein each of the first set of redundant vector equations is formed for any unique pair of the accelerometers.

8. The method of claim 1, wherein each of the second set of redundant vector equations is formed between the particular location and one of the accelerometers.

9. The method of claim 1, wherein the particular location is the center of mass of the rigid body.

10. The method of claim 1, wherein the first technique includes, but is not limited to, least squares fitting and selective Gaussian elimination.

11. The method of claim 1, wherein the second technique includes, but is not limited to, average value and minimization of the rotational term.

12. The method of claim 1, wherein the first and the second techniques are predefined and used consistently throughout the entire direct determination.

13. The method of claim 1, wherein the first and the second techniques are dynamically decided at each solution cycle.

14. A computer program product including a computer usable medium having computer readable code embodied in the medium for causing an application module to execute on a computer for direct determination of angular and translational velocity at a particular location on a rigid body in a global reference frame based on measured accelerations collected from a plurality of independent accelerometers instrumented on the rigid body, the computer program product comprising:

computer readable code for receiving the measured accelerations, orientation of each of the accelerometers and orientation of the rigid body;

computer readable code for forming initial direction cosine matrices in the global reference frame for said each of the accelerometers and for the rigid body using the respective orientations;

computer readable code for initializing current solution time;

computer readable code for transforming measured accelerations to the global reference frame;

computer readable code for calculating global velocity by integrating the transformed global accelerations;

computer readable code for calculating current direction cosine matrices based on previous direction cosine matrices and the angular velocity matrix;

computer readable code for creating a first set of redundant vector equations for the angular velocity;

computer readable code for obtaining the angular velocity by solving the first set of redundant equations using a first solution technique;

computer readable code for creating a second set of redundant vector equations for the translational velocity; and computer readable code for obtaining the translational velocity by solving the second set of redundant equations using a second technique.

15. The computer program product of claim 14, wherein each of the first set of redundant vector equations is formed for any unique pair of the accelerometers.

16. The computer program product of claim 14, wherein each of the second set of redundant vector equations is formed between the particular location and one of the accelerometers.

17. A apparatus for direct determination of angular and translational velocity at a particular location on a rigid body in a global reference frame based on measured accelerations collected from a plurality of independent accelerometers instrumented on the rigid body, said apparatus comprising:

a physical computing system comprising an I/O interface, a communication interface, a main memory, a secondary memory and at least one processor coupled to the main memory, the secondary memory, the I/O interface, and the communication interface, wherein said main memory contains executable instructions which when executed by the at least one processor cause the processor to:

(a) receive the measured accelerations, orientation of each of the accelerometers and orientation of the rigid body;

(b) form initial direction cosine matrices in the global reference frame for said each of the accelerometers and for the rigid body using the respective orientations;

(c) initialize current solution time;

(d) transform measured accelerations to the global reference frame;

(e) calculate global velocity by integrating the transformed global accelerations;

calculate current direction cosine matrices based on previous direction cosine matrices and the angular velocity matrix;

(g) create a first set of redundant vector equations for the angular velocity;

(h) obtain the angular velocity by solving the first set of redundant equations using a first solution technique;
(i) create a second set of redundant vector equations for the translational velocity;
(j) obtain the translational velocity by solving the second set of redundant equations using a second technique;
(k) update the current solution time; and
repeating (d) to (k) until the current time is greater than pre-defined total solution time.

18. The apparatus of claim 17, wherein each of the first set of redundant vector equations is formed for any unique pair of the accelerometers.

19. The apparatus of claim 17, wherein each of the second set of redundant vector equations is formed between the particular location and one of the accelerometers.

* * * * *